Patented Sept. 29, 1942

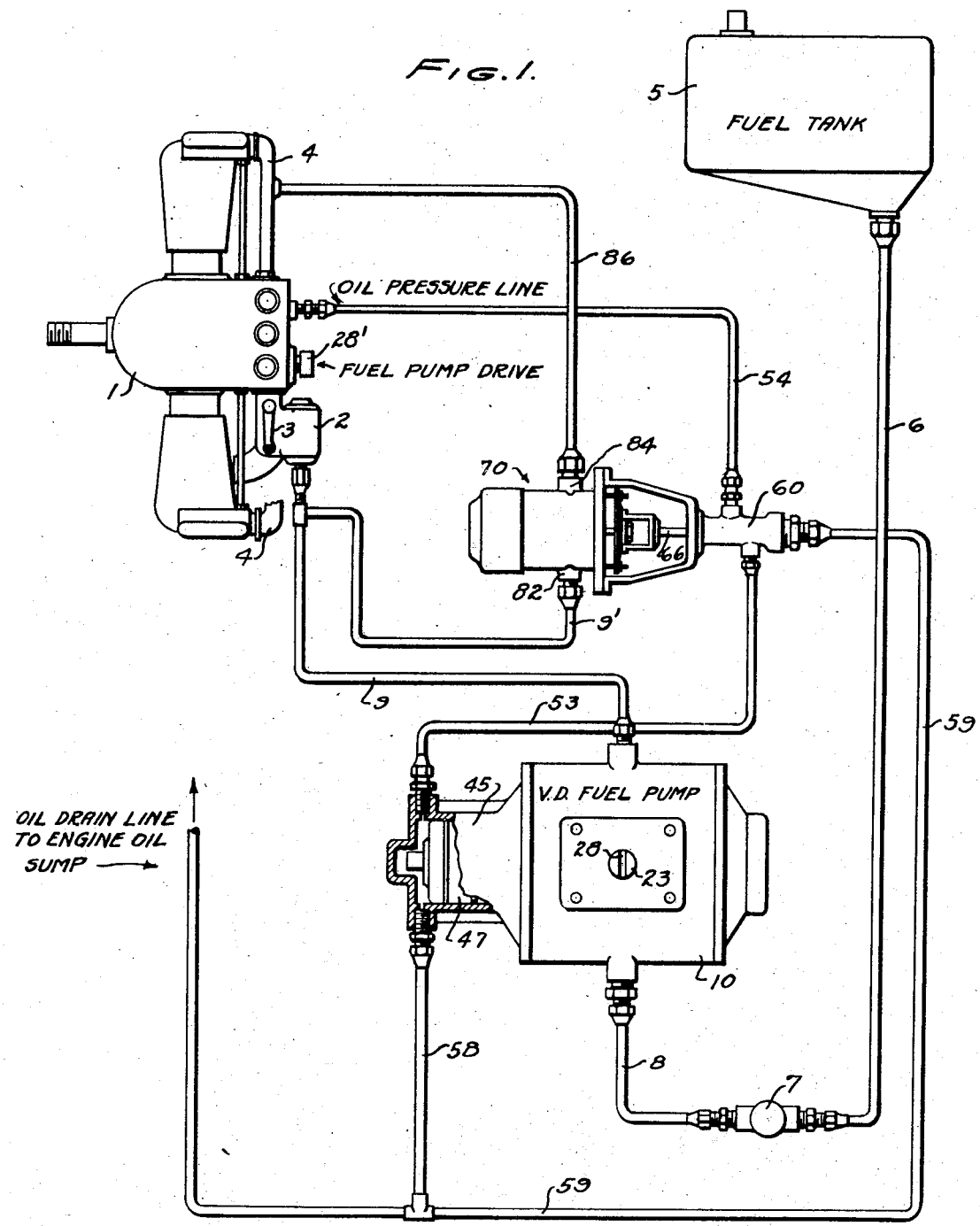

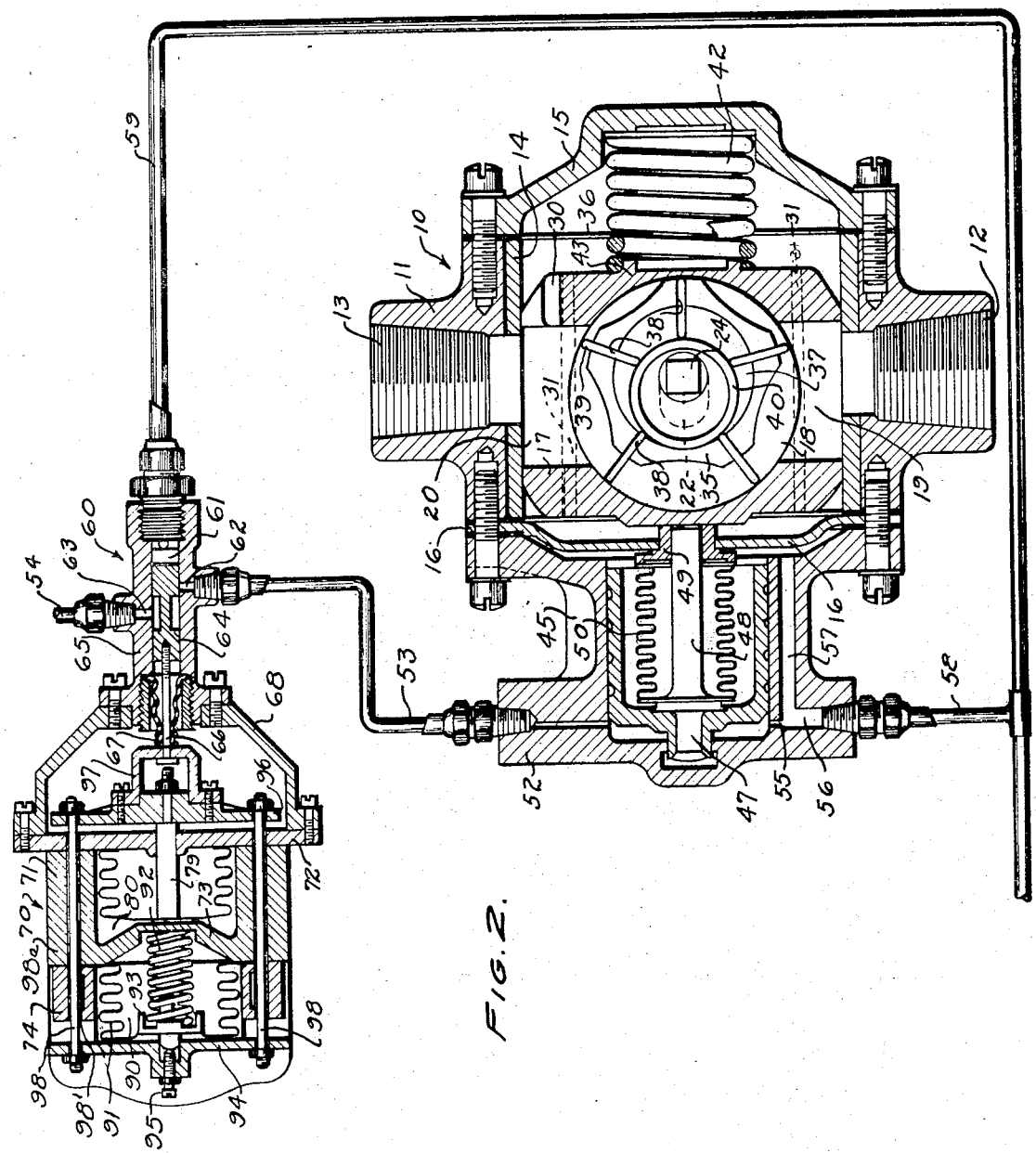

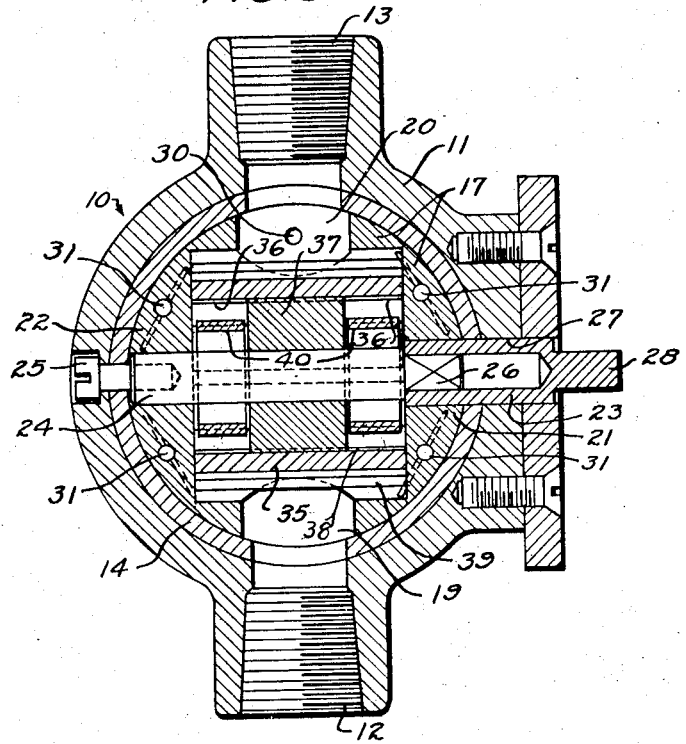
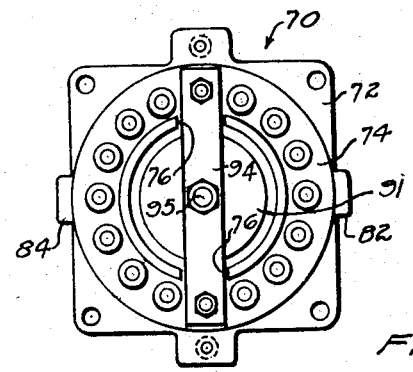
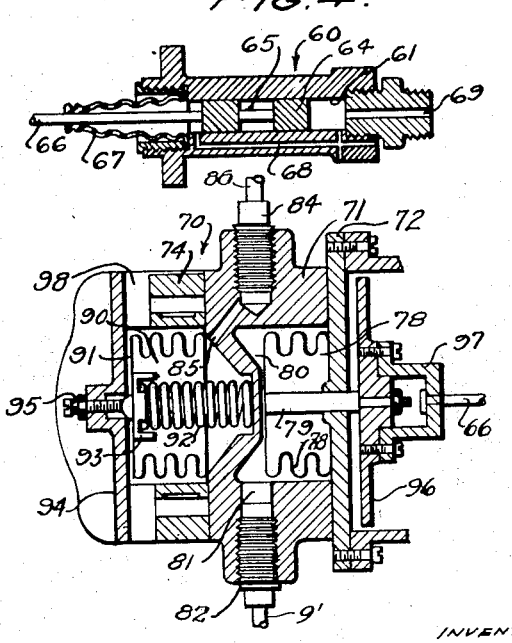

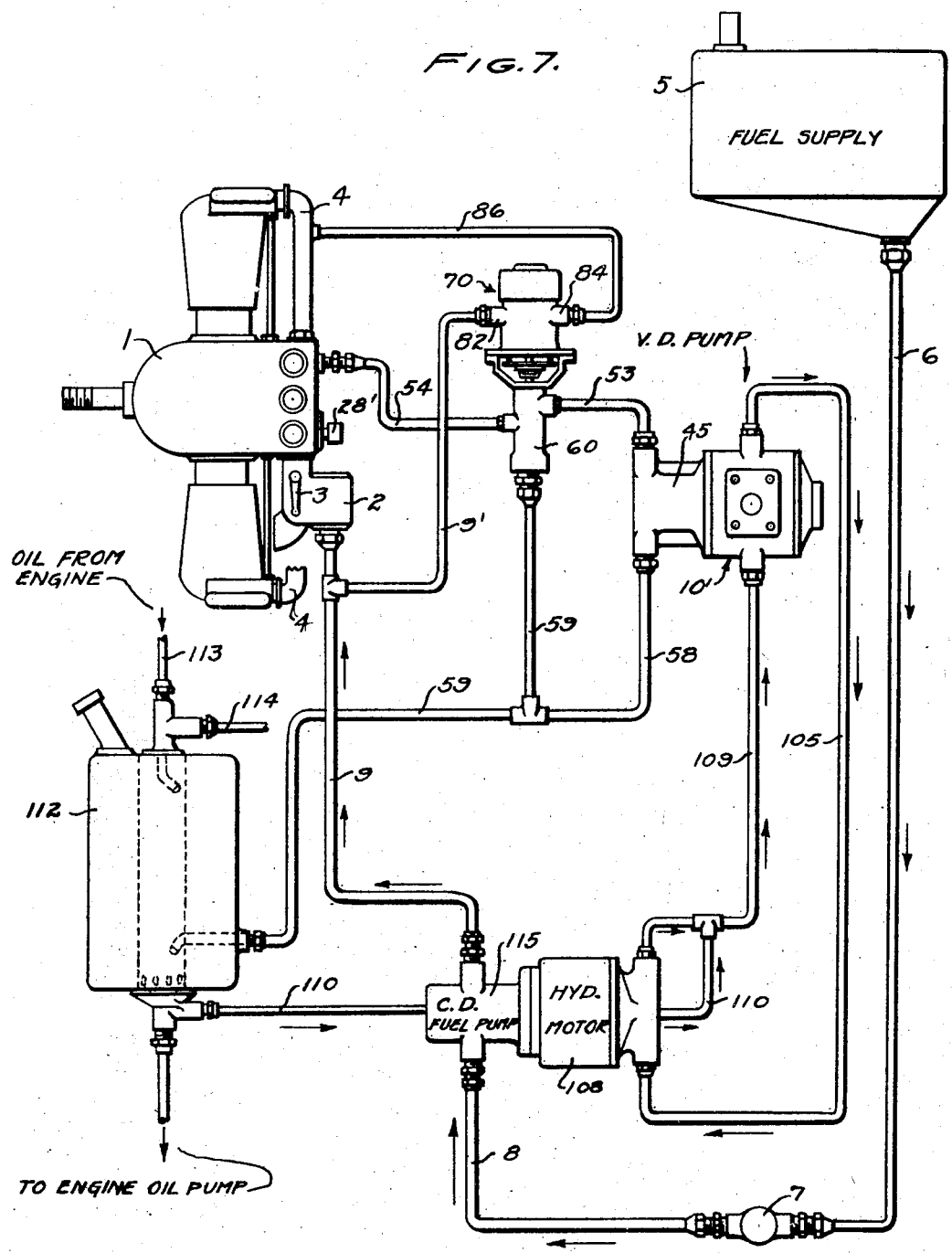

2,296,876

UNITED STATES PATENT OFFICE 2,296,876

AIRCRAFT FUEL SYSTEM

David Samiran and Roy B. Poole, Dayton, Ohio

Application February 24, 1941, Serial No. 380,396

4 Claims. (Cl. 123—139)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to the improvements in aircraft fuel systems and primarily designed to eliminate the tendency of such fuel systems to vapor lock at high altitudes or when the aircraft is subjected to high accelerations during rapid maneuvers.

Aircraft fuel systems as heretofore almost universally employed, have included a source of fuel supply comprising one or more fuel tanks, delivering fuel to a collector located as low as possible within the aircraft relative to the mean fuel level of the fuel tanks, the fuel then being lifted through suction by an engine-driven pump generally of the vane or gear type, the pump delivering the fuel under pressure to a delivery conduit connected to the engine-carburetor-float chamber of a respective engine or engines. It has been the customary practice to maintain the fuel pressure in the delivery conduit substantially constant irrespective of the demand for fuel by inserting a pressure-relief valve and by-pass in communication with the pump-delivery conduit and the inlet side of the pump, the pump normally being designed to deliver a quantity of fuel in excess of the maximum requirement of the associated engine and the excess quantity of fuel being by-passed, the pressure-relief valve being continuously opened to by-pass the excess fuel delivered by the pump. This type of fuel system was satisfactory until the advent of the present high speed, high-altitude type of military aircraft. The extremely high rates of climb possible in present day aircraft has given rise to the situation where the aircraft climbs to a very high altitude in a comparatively short period of time, such that the temperature of the fuel tanks is much higher than the temperature of the outside atmosphere, and this together with the fact that the atmospheric pressure is very much reduced at high altitude causes the gasoline in the fuel lines to either contain a large percentage of vaporized gasoline or to be at the point where such vapor bubbles may easily form, so that the resistance offered by the fuel pressure-relief valve has been found to cause an actual formation of vapor bubbles in the delivery conduit at the point of opening of the relief valve and in the by-pass line, which bubbles escape back into the fuel-delivery conduit and eventually cause a break of the fluid stream allowing the pump to become unprimed, with a resultant failure to deliver the necessary fuel to the engine carburetor causing stoppage of the engine. This difficulty caused by the use of a relief valve has also occurred during high accelerations of aircraft, during violent maneuvers and in some aircraft the inherent vapor-locking tendencies of the fuel system has actually limited the altitude which such aircraft could attain to values far less than the designed maximum ceiling, and in some cases the aircraft could not attain even the designed service ceiling. The present invention proposes to eliminate the difficulty experienced in the prior art fuel systems caused by the use of a pressure-relief valve, by employing a pumping system so designed that the quantity of fuel delivered to the engine carburetor will always be in accordance with the demand for fuel so that no surplus quantity of fuel need be pumped and then by-passed through a restriction, thus eliminating the chief source of fuel system failure at high altitudes and during violent maneuvers. In accordance with one form of the present invention, the aircraft engine drives a variable-delivery-fuel pump which draws its fuel from a collector connected to one or more fuel tanks and delivers the fuel to a delivery conduit connected to the engine-carburetor-float chamber or to injector nozzles as the case might be, and displacement of the fuel pump is controlled through a suitable pressure-responsive-governing means such that the pressure of the fuel in the conduit at the point of delivery is maintained substantially constant irrespective of the quantity of fuel being consumed by the engine. The governing means also incorporates a modifier responsive to the pressure in the intake manifold of the associated engine, this pressure serving as a reference pressure which varies as a function of the engine load rather than the pressure of the outside atmosphere, which of course varies with altitude. By employing a governing device of this character, the control effect of the governing means is dependent on the relation of the fuel pressure to the engine load as measured by the intake-manifold pressure so that the control of the pump is never excessive such as to cause "hunting."

In some types of aircraft due to the particular installation of the fuel tanks and fuel collector, it is very difficult to employ a pump mounted on and driven by the engine because of the fact that the sum of the resistances of the fuel-inlet lines to the pump, the suction head and the vapor pressure of the fuel at the point of inlet to the fuel pump, may exceed the effective suction lift of the pump so that under some flight conditions with such an aircraft, the fuel system may fail at high altitudes due to unpriming of the pump. In order to overcome this difficulty, a modified form of the invention is employed in which a variable-delivery pump driven by the engine is connected to a hydraulic motor which drives a fuel pump located with respect to the fuel collector such that it is required to exert a suction lift which at no time exceeds the sum of the maximum probable vapor pressure and the fuel-line resistance. The variable-delivery pump and the hydraulic motor together form a variable-speed drive for the fuel pump which is preferably of the constant-displacement type, the fuel pump delivering fuel to a delivery conduit in an amount exactly equal to the fuel demand. A pressure-responsive regulator responsive to the fuel pressure in the delivery conduit and to the engine-intake-manifold pressure is provided to control the displacement of the variable-delivery pump, which thus controls the speed of the hydraulic motor connected thereto, to maintain the speed of the constant-displacement-fuel pump at such a value that its delivery will just equal the fuel demand, thus maintaining a substantially constant pressure in the fuel-delivery conduit at the point of delivery irrespective of the fuel demand similar to the previously described fuel system in accordance with the invention. Oil from the engine oil supply is preferably used as a fluid in the working circuit of the variable-speed-hydraulic transmission.

The principal object of the invention is the provision of a fuel system for aircraft and the like, comprising a source of fuel supply and a delivery conduit adapted to deliver fuel to the engine for consumption thereby, of a pumping system for transferring fuel from the source of supply under pressure to the delivery conduit, the said pumping system including a variable-delivery pump operative to vary the output of the pumping system in accordance with the instant displacement of the pump, and a pressure-responsive means responsive to variation in pressure of the fuel in the delivery conduit operative to control the displacement of the variable-delivery pump to maintain the pressure in the fuel-delivery conduit substantially constant irrespective of the demand for fuel by the engine.

A further object of the invention is the provision in the fuel system of the character described of a pumping system whose output is controlled by a variable-delivery pump and governing means for said pump responsive to variation in the output pressure of said pumping system as well as variations in a pressure indicative of engine load.

A further object of the invention is the provision of a fuel system for internal combustion engines, comprising a variable-delivery-pumping means for supplying fuel from a supply source to a delivery conduit for consumption by the associated engine, the displacement of said variable-delivery pump being controlled so as to maintain the delivery of fuel to the delivery conduit in an amount exactly equal to the demand for fuel by the engine.

Another object of the invention is the provision in a fuel system for an internal combustion engine of the constant-displacement pump for supplying fuel from a source of supply to a conduit, for delivering fuel to the engine for consumption thereby, the constant-delivery pump being driven through a variable-speed-hydraulic transmission including a pump element and a motor element, one of said elements being of the variable-displacement type and having associated therewith a pressure-responsive-governing mechanism responsive to variation in the fuel pressure in said conduit at the point of delivery from a predetermined value.

A further object of the invention is the provision in combination with a variable-displacement pump having a displacement varying means, of a fluid-pressure-actuated servomotor for operating said displacement varying means, a control valve controlling admission of fluid under pressure to said servomotor, and a restricted drain connection associated with said servomotor whereby a continuous flow of fluid is maintained through said servomotor.

A further object of the invention is the provision in a variable-displacement pump having controllable power means for varying the displacement of the pump, of a displacement varying means for the pump including a pump stator shiftable in a stationary pump housing, the stator cooperating with a pump rotor and having pressure-balancing ports interconnecting the chambers formed in said casing at opposite ends of the stator with the output side of the pump, whereby the stator is pressure-balanced under all load conditions in the direction of shifting of said stator.

Other objects of the invention not specifically pointed out above will become apparent by reference to the detailed description hereinafter given taken in conjunction with the appended drawings in which:

Figure 1 diagrammatically illustrates the elements of one form of the present invention;

Figure 2 is a view partly in section illustrating the detailed construction of a variable-delivery pump and pressure-responsive-control mechanism therefor as employed in the device of Figure 1;

Figure 3 is a sectional view of the variable-displacement pump of Figure 1 taken on line 3—3 of Figure 2;

Figure 4 is a sectional view illustrating details of a control valve illustrated in Figure 2;

Figure 5 is an end elevation of the pressure-responsive-control mechanism illustrated in Figure 2, the enclosing cover being removed;

Figure 6 is a top plan view partly in section of a pressure-responsive-control device illustrated in Figure 2 and illustrating the pressure connections thereof; and Figure 7 is a diagrammatic illustration of the elements of a modified form of the invention illustrated in Figure 1.

Referring now to Figure 1, the reference numeral 1 illustrates a conventional aircraft engine having a carburetor 2 and a throttle control actuating means 3, the carburetor feeding an explosive mixture to the intake manifolds 4 for consumption by the engine. The supply of fuel for the engine 1 is stored in one or more fuel tanks 5 which through the respective conduit or conduits 6 supply fuel to a common collector 7 generally located as low as necessary to insure complete drainage of all the tanks. The collector 7 may have associated therewith a suitable valve mechanism, not shown, for shutting off the supply of fuel from any one or all the tanks 5. Fuel flows from the collector 7 to a single outlet conduit 8 connected to the inlet side of the variable-delivery pump generally indicated by the reference numeral 10, the delivery side of the pump 10 being connected to a delivery conduit 9 which conducts fuel under pressure to the float chamber of the carburetor 2, the latter being vented to the atmosphere, or in the case of a supercharged engine connected to the supercharger blower output. Variable-displacement pump 10 is adapted to be directly driven from the engine by means of fuel-pump-drive shaft 28' and has its displacement varying means controlled by a fluid-pressure-actuated servomotor 45 connected by means of a conduit 53 to a control valve 60 which controls the admission of fluid pressure from the conduit 54 connected to the oil-pressure system of the engine 1, to the conduit 53. The servomotor 45 also has connected therewith a drain conduit 58 which allows a continuous flow of fluid through the servomotor to a drain line 59 which returns the oil either directly to the engine pump or to the engine oil tank, the drain conduit 59 also draining any leakage oil from the control valve 60, the control valve 60 being in turn controlled by a pressure-responsive device generally indicated by the reference numeral 70 and responsive to the pressure fuel in the delivery conduit 9 at the point of delivery to the carburetor by means of the branch conduit 9' and also responsive to the manifold pressure in the intake manifolds 4 of the engine 1 transmitted through a conduit 86. The servomotor 45 under the control action of the valve 60 and pressure-responsive device 70 is adapted to adjust the delivery of the variable-delivery pump 10 in such a manner that the pump will deliver a quantity of fuel to the delivery conduit 9 in an amount exactly equal to the demand for fuel by the engine carburetor maintaining the proper fuel supply by maintaining the pressure in the delivery conduit 9 adjacent the point of delivery substantially constant. In order to prevent any "hunting" and to maintain the control of the pressure-responsive device 70 such that the displacement of the pump will be exactly in accordance with the fuel demand, the control exerted on the pressure-responsive device 70 by fuel pressure at the point of delivery through the branch conduit 9' is compared with the existing engine-intake-manifold pressure which is a measure of the load condition on the engine 1. By this arrangement, the tendency to overcontrol is eliminated resulting in an improved control of the pump over a governing system controlling solely in accordance with the pump output pressure. A detailed construction of the pump 10 and its associated control mechanism will now be described.

Referring to Figures 2 and 3, the variable-displacement pump 10 is seen to comprise a generally cylindrical housing or casing 11 provided with a fuel inlet 12 and a fuel outlet 13. The casing 11 is provided with a longitudinally extending annular steel liner 14 forming a central cylindrical chamber in the pump casing 11. The pump casing 11 is adapted to be closed at one end by means of a cover plate 15 secured thereto by screws or the like, and at the other end by a dished metal cover 16 also secured to the housing by suitable screws. A cylindrical pump stator 17 formed in a plurality of sections secured together by dowels or other means not shown, is journalled in the liner sleeve 14 and reciprocable therein. The sections of the stator 17 are so made that they form a central cylindrical chamber 18 extending transversely of the longitudinal axis of the liner sleeve 14, the chamber 18 forming a pumping chamber and communicating with the pump inlet 12 by means of an elongated inlet port 19 and communicating with the pump outlet 13 by means of a similar elongated discharge port 20. By means of these elongated inlet and outlet ports, the pump stator 17 may be shifted axially within the liner 14 with the pump chamber 18 always remaining in communication with the pump inlet and outlet in the casing 11. The pump stator 17 is provided with elongated slots 21 and 22 formed in its side walls so as to respectively clear a driving sleeve 23 and driving shaft 24 journalled in the pump casing 11 and allow the necessary reciprocation of the pump stator 17 axially relative to the pump casing 11 and liner sleeve 14, but preventing any rotation of the pump stator 17 relative to the liner sleeve 14. The outer end of the driving shaft 24 is supported on a spindle bearing 25 secured in the casing 11 and has its inner end supported in the hollow driving sleeve 23 the shaft being driven by means of the squared end projection 26, the sleeve 23 also being journalled as at 27 in the casing 11, the outer end of the driving sleeve 23 being provided with a squared end portion 28 which is adapted to be connected to the fuel-pump-driving shaft 28' of the engine 1 (Figure 1). The pump stator 17 is provided with a port 30 which communicates with the stator outlet port 20 which in turn communicates with the interior of the casing 11 and allowing fluid to flow through pressure-balancing ports 31 to the portions of the casing on opposite ends of the stator to cause an equal pressure on the opposite ends of the stator 17 allowing the same to be shifted within the liner 14 without interference from pressure differences arising by virtue of any leakage of pressure fluid into the pump casing. A pump rotor 35 is mounted within the pump chamber 18 of the pump stator 17 and is provided with recessed end portions 36 and secured to the driving shaft 24 by means of a central spider 37, the spider being pressed into the rotor and pressed or otherwise secured to the shaft 24. The rotor 35 is provided with longitudinally extending slots 38 which serve as guides for the slidable pump vanes 39, the ends of the vanes and the end faces of the rotor 35 contacting the end walls of the cylindrical chamber 18 in sealing relation and the upper ends of the vanes contacting the periphery of the chamber 18 along their lengths, while at their inner ends the vanes 39 contact a pair of hardened annular rings 40 respectively placed in the recessed portions 36 of the rotor 35. If the pump stator 17 is shifted so that the axis of the cylindrical pump chamber 18 is eccentric with respect to the axis of the driving shaft 24, the pump vanes 39 will reciprocate in the rotor slots 38 and form expansible chambers therebetween which increase in capacity as the rotor rotates the vanes from the discharge port toward the inlet port in the direction indicated by the arrow in Figure 2, the space between the vanes being filled with fluid from the inlet port 19 and thus fluid is transferred to the outlet port 20 discharging into the pump outlet 13, the vanes 39 moving inward relative to the rotor 35 causing a decrease in the capacity of the chamber formed between two adjacent vanes as the vanes rotate past the discharge port 20. The pump capacity will be zero when the axis of the rotor 35 and the chamber 18 of the pump stator 17 are coincident and the pump capacity will be progressively increased as the pump stator 17 is shifted to the extreme position as illustrated in Figure 2. The pump stator 17 is urged into the maximum displacement position by means of a spring 42 which has one end resting on an abutment formed by the cover plate 15 and its other end in engagement with one end of the stator 17, the spring being maintained in proper alignment by means of a spring seat 43 formed on the end of the support 17. The displacement of the pump 10 is controlled by means of a fluid-pressure servomotor 45 comprising a casing secured to the pump casing 11 by means of the same screws which retain the pump-casing-cover plate 16, the servomotor casing having a cylindrical bore 46 therein serving in conjunction with a reciprocable piston 47 to form an expansible chamber. The piston 47 is provided with a piston rod 48 which projects through a bushing 49 centrally disposed in the cover plate 16, the outer end of the piston rod being in contact with the end of the pump stator 17 opposite the spring 42. Leakage of pressure fluid within the pump casing 11 into the servomotor cylinder is prevented by means of a flexible-metal-sealing bellows 50 having one end secured as by sweat-soldering to the bushing 49 and having its other end suitably secured to the inner end of the piston rod 48 and adjacent its connection to the hollow piston 47. The outer end of the servomotor cylinder is connected by means of a drilled passage 52 to a pressure conduit 53 and at its lower side the space above the piston 47 is connected by means of a restricted passage 55 to a drain outlet 56, the drain outlet also being connected by means of a lateral passage 57 to the space enclosed on the underside of the piston 47 to drain off any fluid leaking past the piston, the drainage chamber 56 being connected by means of a conduit 58 to a drain conduit 59 leading either direct to the oil pump of the crank case (Figure 1) or to the engine oil tank. The admission of oil under pressure to the servomotor through the conduit 53 is controlled by means of a control valve 60 which controls the admission of fluid from the oil pressure line 54 to the condliut 53.

As seen in Figures 2 and 4, the valve 60 comprises a cylindrical valve body having a central bore 61 which communicates with a drilled passage 62 connected to the conduit 53 and also by means of a drilled passage 63 with the oil pressure conduit 54, a piston type valve 64 is reciprocable in the bore 61 and is provided with an annular groove 65 through which oil may pass from the passage 63 to the passage 62 and conduit 53 with a pressure determined by the amount the edge of the valve laps the passage 62. The valve 64 is adapted to be reciprocated in the valve bore 61 by means of a valve control rod 66. The inner end of the valve bore 61 is sealed from the outside atmosphere by means of a flexible boot 67 secured to the valve rod 66 and retained at its inner end by a suitable packing nut, the outer end of the valve bore 61 being connected to the portion of the bore at the inner side of the piston valve by means of a passage 68 (Figure 4) so that the valve 64 is pressure-balanced and any leakage of oil passed to piston valve 64 being withdrawn from the valve bore 61 by means of a drain passage 69 connected to the drain conduit 59.

As the piston valve 64 of the valve 60 is moved to allow the passage of oil under pressure from the conduit 54 to the conduit 53 (Figure 2), the oil under pressure will be admitted to the cylinder of the servomotor 45 causing the piston 47 to move axially toward the right and in shifting the pump stator 17 against the resistance of the spring 42 thereby tending to reduce the capacity of the pump 10, at any time, the capacity of the pump 10 will be determined by the position of the pump stator 17 which in turn will be determined by the pressure within the servomotor cylinder acting in opposition to the resistance of the spring 42, i. e., as the pressure in the servomotor cylinder is increased or decreased, the pump capacity will be respectively decreased or increased as the case might be. Since the oil under pressure utilized for the actuation of the pump-capacity-varying means is taken from the engine oiling system, if the oil were trapped in the servomotor cylinder, it would become cooled and increase in viscosity to such an extent that the servomotor response to movement of the control rod 66 would be very sluggish and fail to give the necessary sensitivity required for proper operation of the fuel system. This disadvantage is obviated in the present invention by providing the restricted bleed or drain passage 55 which allows a continuous flow of warm oil through the servomotor cylinder and causing a pressure drop in the conduit 53 which necessitates a continuous partial opening of the passage 62 by the valve 64. Since there is always a slight variation in oil pressure due to engine operation, there will always be a small oscillation of the valve 64 and the piston 47, tending to overcome any static friction in the control system and rendering the control very sensitive and responsive. Since there is a continuous drainage of fluid from the cylinder of the servomotor 45, the displacement of the pump 10 will be dependent upon the pressure existing within the servomotor cylinder which pressure in turn is dependent upon the relative position of the sleeve 64 and the port or passage 62, i. e., the axial movement of the valve 64 relative to the port 62 determines the position of the pump stator 17 relative to the pump rotor 36 and hence controls the pump displacement.

The means for controlling the piston valve 64 of the valve unit 60 is illustrated in Figures 2, 5 and 6, and as seen in Figure 2 comprises a pressure-responsive device generally indicated by the reference numeral 70, which includes an annular housing 71 closed at one end by a cover plate 72 suitably secured thereto by means of screws not shown, and having its other end closed by a dished-wall member 73 formed integral therewith. At its outer end the casing 71 has an additional annular housing 74 secured thereto by means of screws 75 and being provided at its outer end with guiding slot 76 (Figure 5). The housing 71 encloses a flexible-metal bellows 78 having its outer end secured to the cover plate 72 and having its inner end connected to a rod 79 which projects through the cover plate 72. The metal bellows 78 in conjunction with the housing 71 forms an expansible chamber 80 which as seen in Figure 6 is adapted to communicate by means of drilled passages 81 in the housing 71 and the boss 82 with the conduit 9' (Figure 1) so that the chamber 80 is continuously filled with fuel from the conduit 9 and under the same pressure as exists within the conduit 9 due to the pump delivery. Similarly as seen in Figure 6, the space beyond the wall 73 of the casing 71 forming a chamber 90 communicates by means of drilled passages 85 formed in the casing wall 73 and boss 84 with the conduit 86 connected to the engine-intake manifold 4 (Figure 1). Referring again to Figure 2, the chamber 90 is formed by the interior of a second flexible-metal bellows 91, the inner end of the bellows being secured in sealing relation between the housing portions 71 and 74, and having its outer end secured to a movable abutment 93 which is urged outwardly by means of the internal spring 92 which transmits its force to a plate 94, the compression of the spring being adjustable by means of an adjustment screw 95 which adjustment determines the desired fuel pressure. A rod 79 connected to the bellows 78 is secured to a plate 96 which in turn carries a bridle 97 connected to the valve rod 66 of the valve 60, the plates 94 and 96 being integrally connected by means of a pair of rods 98 which pass through suitable drilled passages 98′ formed in the housing members 71 and 74, the plate 94 being guided by the guide slots 76 as previously mentioned provided in the extension housing 74. As fuel under pressure is admitted to the passages 81 and chamber 80 through the boss 82 (Figure 6), the metal bellows 78 will be compressed causing axial movement of rod 79, plate 96, and valve rod 66 to the right as seen in Figure 2, and movement of the plate 96 to the right causes a similar movement of the plate 94, abutment 93 and bellows 91 against the resistance offered by the loading of the spring 92, the existing manifold pressure within the chamber 90 formed by the bellows 91 adding to or subtracting from the effect of the loading of the spring 92 dependent upon the engine load, i. e., when the manifold pressure is high the effect of loading of the spring is increased and vice versa, this modifying effect altering the shifting of the valve 64 due to the effect of variation of fuel pressure within the chamber 80. A dust cover 99 is provided surrounding the bellows 91. The bellows 78 is subjected to atmospheric pressure on the inside thereof and the bellows 91 is subjected to atmospheric pressure on the outer side thereof and by making the bellows of substantially equal size, the effect of the changing atmospheric pressure on the control mechanism is neutralized, the pressure-responsive device 70 thus responding by means of a suitable design for the spring 92 to the differential in pressure between the fuel pressure admitted to the chamber 80 and the engine-intake-manifold pressure admitted to chamber 90. The shifting of the valve rod 66 is thus seen to depend on the variation of the delivery pressure of the pump 10 as well as on a pressure depending upon the load condition of the engine. This modifying of the control has been found to result in an improved action due to the fact that a change in engine load causing an increased demand for fuel causes a decrease in the engine-manifold pressure allowing the reduced pressure within the chamber 90 to increase the effect on the load of the spring 92 and assist in the shifting of the valve 64 of the valve unit 60 to thereby control the pump displacement and hence its output. Simultaneous with the increase in engine load there will be an increased demand for fuel exerted upon the pump 10 which will result in a drop in fuel pressure in delivery conduit 9 (Figure 1) causing a decrease in pressure within the chamber 80 of the pressure-responsive device 70 causing an expansion of the bellows 78 and movement of the rod 79 and plate 96 towards the left as seen in Figure 2, also causing a motion of the valve rod 66 to the left decreasing the amount of oil and hence the pressure thereof transmitted through the passage 62 and conduit 53 to the servomotor 45, allowing the spring 42 to move the stator 17 of the pump to the left to increase the pump output. Since the motion of the valve rod 66 is resultant of the variation in manifold pressure as well as the variation in fuel pressure, the control effect is not thus wholly dependent upon the change in fuel pressure and the tendency to over-control, characteristic of pressure regulators, is eliminated or greatly reduced, thus preventing "hunting" and fluctuation in the output of the delivery pump 10.

*Operation*

The operation of the fuel system illustrated in Figures 1 to 6 inclusive is as follows: With the engine stopped there will be no oil pressure existing within the servomotor cylinder 46 of the servomotor 45 (Figure 2) thus allowing the spring 42 to move the pump stator 17 to the left in the position of maximum displacement as illustrated. When the engine is started by pumping fuel to the carburetor by a hand-pump (not shown), the engine-driven pump 10 will then immediately begin to draw fuel from the inlet conduit 8 from the collector 7 and deliver the fuel under pressure to the conduit 9. As the fuel pressure builds up the valve 64, of the control valve unit 60, will be moved axially towards the right due to increase of fuel pressure in the chamber 80, causing an increase in oil pressure within the conduit 53 and allowing the servomotor 45 to shift the pump stator 17 towards the right against the resistance of the spring 42 to decrease the pump output. Simultaneous with the increase of fuel pressure, the manifold pressure of the idling engine is high causing a reduction of the effect of loading on the spring 92 tending to assist in the movement of the valve 64 of the valve unit 60 axially toward the right until the fuel pressure comes up to the predetermined value in which the force exerted on the bellows 78 is in proper balance with the initial loading of the spring 92, thereafter the pressure-responsive device 70 will be operative through the medium of the control valve unit 60 to maintain the displacement of the pump 10 in exact equilibrium with the demand for fuel by the engine as previously explained. The provision of the continuous but restricted flow of oil through the pressure conduit 53 from the valve unit 60 to the servomotor cylinder 46 prevents the accumulation of cold viscous oil in the cylinder greatly aiding in securing the sensitive control. The minor fluctuations in oil pressure occurring in the oil-pressure-supply line 54 in conjunction with the continuous flow of fluid through the restricted port 55 allows a slight oscillation of the valve 64 and piston 47 as previously noted to eliminate the static friction in the control system, further aiding in securing the necessary sensitive control.

By means of the above-described fuel system, it is possible to insure continuous operation of the aircraft power plant up to the maximum altitude capable of being attained by the particular craft in question, since the question of vapor-locking due to restriction of flow in the delivery line as formerly occurred in the prior art fuel systems has been eliminated thus reducing the possibility of vapor-locking with its attendant evil of power plant failure.

In certain aircraft fuel system installations, it becomes impracticable, if not impossible, to operate the fuel pump directly by the engine because of the fact that the required suction lift of the pump may exceed the effective lift of the pump under certain flight conditions particularly at high altitudes and to eliminate this difficulty, it becomes necessary to locate the pump at such a point that its effective suction lift will be adequate under all flight conditions and in some instances, it may be possible to locate the pump adjacent the fuel collector so that the pump is continuously primed and need exert no suction lift, and in order to locate the fuel pump in such a desirable position in those cases where such an installation is necessary, the fuel system in accordance with the invention as illustrated in Figure 1 is modified to form the system illustrated in Figure 7. In Figure 7, a variable-displacement pump 10' identical with the pump 10 of Figure 1 is adapted to be directly driven by the engine 1 in the same manner as in the device of Figure 1, the pump however being employed as the pressure generator or driving end of a hydraulic transmission, the pump displacement being controlled however in exactly the same manner as in the device of Figure 1 by means of the control valve unit 60 and pressure-responsive device 70. The variable-displacement pump 10' is connected by means of a conduit 105 to the inlet side of a hydraulic motor 108, the outlet or return side of which is connected to the inlet side of the pump 10' by means of the return conduit 109, the return conduit 109 also being connected by means of a conduit 110 to the outlet of the engine-oil tank indicated by the reference numeral 112, the oil supply in the tank 112 serving as a make-up for the hydraulic transmission. the drain connections 58 and 59 for the servomotor 45 and valve 60 also being connected to drain into the oil tank 112. Oil returned by the engine-scavenging pump from the crank case is allowed to enter the oil tank by means of a conduit 113, and a conduit 114 is provided for admitting gasoline as an oil diluent for easy starting in cold weather as now generally employed in the art. The hydraulic motor 108 is adapted to be directly connected to a constant-displacement-fuel pump 115, the pump and motor being located remote from the engine 1 in the most advantageous position relative to the fuel collector 7. The fuel pump 115 is adapted to draw fuel from the inlet conduit 8 and deliver fuel to the delivery conduit 9 under pressure in an amount dependent upon the speed of rotation of the hydraulic motor 108.

Since the speed of rotation of the hydraulic motor 108 is dependent upon the quantity of oil delivered by the variable-displacement pump 10', the control of the pump 10' serves as a means for varying the quantity of fuel delivered by the pump 115. Since the pressure-responsive control element 70 is responsive to variation in the fuel delivery pressure and to the engine-manifold pressure in exactly the same manner as in the device of Figure 1, the control of the output of the pump 10' forming a driving end of the hydraulic transmission will control the speed of the hydraulic motor 108 and hence the speed of constant-displacement-fuel pump 115 so that the fuel delivery of the pump 115 will be exactly in accordance with the demand of the engine, this system thus being the equivalent of the system of Figure 1, i. e., the variable-displacement pump 10', hydraulic motor 108 and constant-displacement-fuel pump 115 together form a pumping system the output of which is controlled by the displacement of a variable-displacement pump.

As is well known in the hydraulic transmission art, the speed of the driven end may be varied either by varying the output of the driving end or by varying the capacity of the driven end in the inverse order, i. e., to employ a constant-displacement pump for the driving end and a variable-displacement motor for the driven end varying the capacity of the motor such that the capacity is decreased to increase the speed of the motor and increasing the motor capacity to decrease its speed for a substantially constant fluid output from the driving end of the transmission. Although the transmission illustrated in the device of Figure 7 employs a variable-displacement pump at the driving end of the transmission, it is to be understood that the invention also includes the control of the driven end of the transmission as explained above, since both methods of control of the hydraulic transmission are well known in the art and equivalent one to the other.

While preferred embodiments of the invention have been illustrated and described, other variations and modifications thereof will become apparent to those skilled in the art as falling within the scope of the appended claims.

We claim:

1. A fuel system for an internal combustion engine having an intake manifold comprising, a source of fuel supply, a variable output-pumping system connected to said fuel supply, said pumping system including a delivery conduit for conducting fuel under pressure to said engine for consumption thereby, a variable-displacement pump for controlling the fuel delivery of said pumping system, and a pressure responsive governing means including a control element operative to control the displacement of said variable-displacement pump, said governing means having a resilient loading means opposing movement of said control element in one direction, a first pressure responsive means responsive to fuel pressure at the point of delivery operative to move said control element in said one direction, and a second pressure responsive means for modifying the movement of said control element in response to the instant pressure within the engine intake manifold, and the net movement of said control element being in response to the absolute difference between the said fuel and intake manifold pressures.

2. A fuel system for an internal combustion engine having an inlet manifold comprising, a source of fuel, a delivery conduit, a variable-displacement engine driven pump for pumping fuel from said source into said delivery conduit for consumption by the associated engine, control means for varying the displacement of said pump and pressure responsive governing means including a control element operative to control the displacement of said variable-displacement pump, said governing means having a resilient loading means opposing movement of said control element in one direction, a first pressure responsive means responsive to fuel pressure at the point of delivery operative to move said control element in said one direction, and a second pressure responsive means for modifying the movement of said control element in response to the instant pressure within the engine intake manifold, and the net movement of said control element being in response to the absolute difference between the said fuel and intake manifold pressures.

3. A fuel system for an aircraft engine having an intake manifold comprising, a source of fuel, a conduit for delivering fuel to the associated engine, a constant-displacement-fuel pump for pumping fuel from said source to said conduit, a hydraulic-variable-speed transmission for driving said fuel pump, said transmission including a variable-displacement pump, a constant-displacement-fluid motor connected to said pump and pressure responsive governing means including a control element operative to control the displacement of said variable-displacement pump, said governing means having a resilient loading means opposing movement of said control element in one direction, a first pressure responsive means responsive to fuel pressure at the point of delivery operative to move said control element in said one direction, and a second pressure responsive means for modifying the movement of said control element in response to the instant pressure within the engine intake manifold, and the net movement of said control element being in response to the absolute difference between the said fuel and intake manifold pressures.

4. In a fuel system for an internal combustion engine having an intake manifold, a source of fuel supply, a conduit for conducting fuel to said engine for consumption thereby, a constant-displacement-fuel pump located remote from said engine and connected to said source of supply and to said conduit for delivering fuel under pressure to said conduit, a fluid-pressure-actuated-variable-speed transmission including a pressure generating driving element driven by the engine and a driven element drivingly connected to said fuel pump, one of said elements being of the variable-capacity type and the other of said elements being of the fixed-capacity type and adapted to run at a speed dependent upon the instant capacity of said variable-capacity element and pressure responsive governing means including a control element operative to control the instant capacity of said variable-capacity element, said governing means having a resilient loading means opposing movement of said control element in one direction, and a second pressure responsive means for modifying the movement of said control element in response to the instant pressure within the engine intake manifold, and the net movement of said control element being in response to the absolute difference between the said fuel and intake manifold pressures.

DAVID SAMIRAN.
ROY B. POOLE.